United States Patent [19]
Fautz

[11] 3,842,726
[45] Oct. 22, 1974

[54] GROOVED GRIDDLE
[75] Inventor: Howard C. Fautz, Long Beach, Calif.
[73] Assignee: Wolf Range Company, Baltimore, Md.
[22] Filed: Aug. 20, 1973
[21] Appl. No.: 390,163

[52] U.S. Cl. .................................. 99/425, 99/445
[51] Int. Cl. .......................................... A47j 37/10
[58] Field of Search ............ 99/445, 331, 422, 425, 99/446, 450

[56] References Cited
UNITED STATES PATENTS

| | | | |
|---|---|---|---|
| 2,786,929 | 3/1957 | Michaelis | 99/422 X |
| 3,266,409 | 8/1966 | Oyler | 99/331 |
| 3,301,170 | 1/1967 | Beasley | 99/446 X |
| 3,384,195 | 5/1968 | Jepson et al. | 99/331 X |
| 3,407,723 | 10/1968 | Varkala | 99/425 X |

Primary Examiner—Harvey C. Hornsby
Assistant Examiner—Arthur O. Henderson
Attorney, Agent, or Firm—Fulwider, Patton, Rieber, Lee & Utecht

[57] ABSTRACT

A grooved griddle for grilling or broiling foods. The griddle includes a plate having longitudinal grooves sloped so that food fats that drop into the grooves flow downwardly toward a collection area. The grooves terminate inwardly of the rear of the plate in a configuration which facilitates cleaning. Heat sensors located in recesses in the underside of the plate detect localized temperature drops. The ridges between the grooves are preferably flat to provide uniform sear stripes on the food, and the grooves preferably increase in depth from the rear to the front of the plate to promote grease drainage and uniform heating.

6 Claims, 9 Drawing Figures

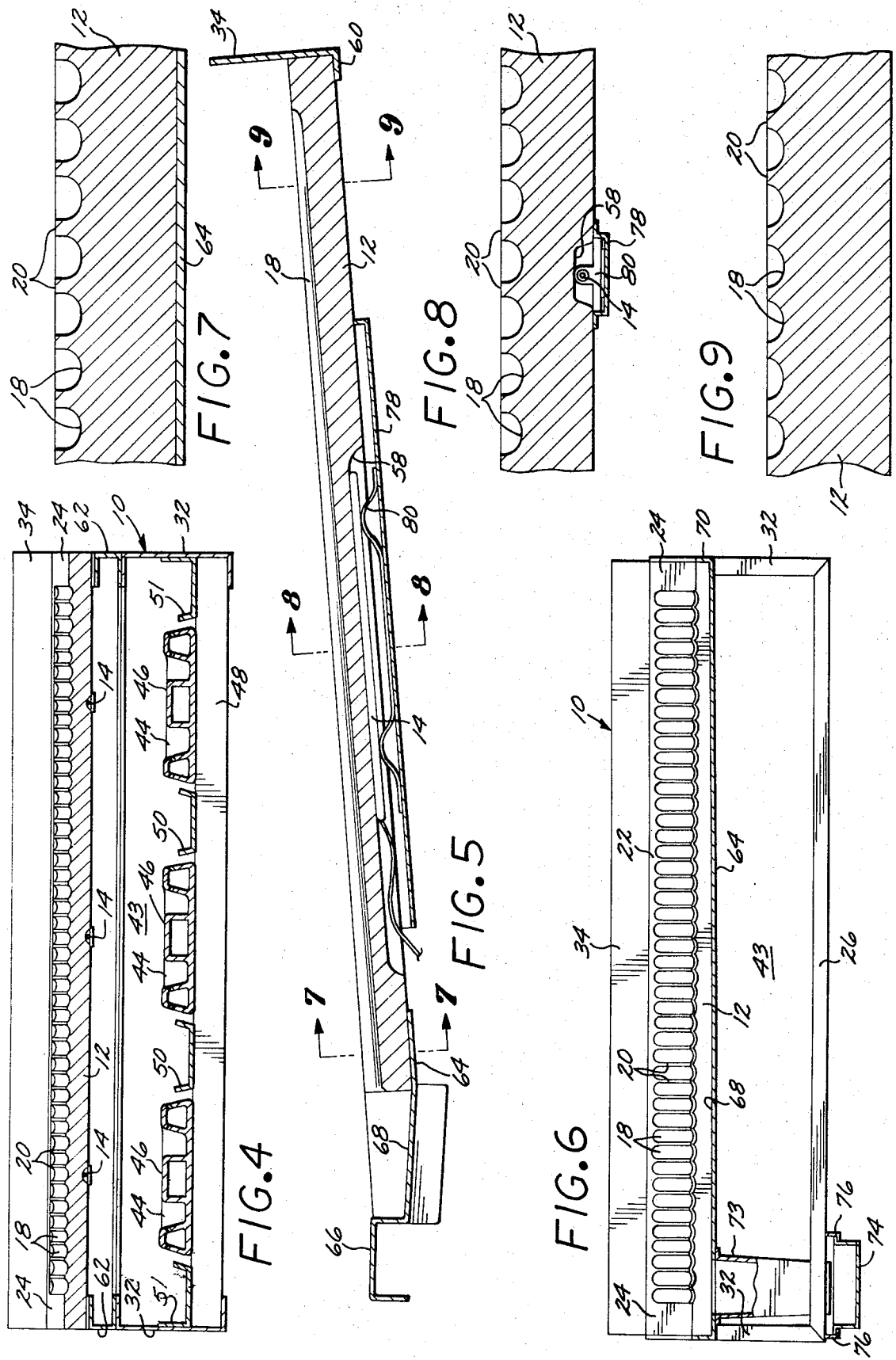

GROOVED GRIDDLE

BACKGROUND OF THE INVENTION

1. Field of the Invention

The present invention relates to a griddle for cooking foods, including broiling, grilling and the like, and more particularly to a grooved griddle having a continuous, unapertured grilling or broiling area to prevent liquified food fats from dropping into the firebox.

2. Description of the Prior Art

The typical steak griddle now used in commercial restaurants, for example, comprises a plurality of elongated parallel rods forming a grid for location above a heat source, such as electrical units, gas burners or the like. The rods provide desired sear marks across the cooking meat, while fat dropping from the meat falls onto the heat source and produces smoke. The smoke was desired to give the meat a particular charred flavor. However, many communities now object to the excessive smoke produced by this cooking process and some restaurants have had to curtail or even eliminate such cooking because of intolerable smoke emission to the atmosphere.

SUMMARY OF THE INVENTION

According to the present invention, a continuous, unapertured grilling or broiling area is provided by a grooved, relatively thick griddle plate through which liquified food fats cannot drop into the area of the heat source. Instead, the upper surface of the griddle slopes downwardly from rear to front so that the liquified food fats flow into the grooves and toward a gutter or collection area at the front of the griddle. The gutter is sloped toward a collection box for collection at one corner of the griddle.

A portion of the liquified food fats become hot enough to provide the meat with a smokey flavor, but most of it is drained off. Meat placed upon the griddle, particularly frozen meat, often causes a rapid temperature drop in a localized area. Consequently, the plate underside includes spaced recesses to receive heat sensors. These form part of a thermostatic control system for individually regulating the intensity of a plurality of heat sources located in a firebox below the plate.

The ridges between the griddle grooves are flat to provide uniform sear stripes, and the grooves increase in depth from the rear to front to facilitate grease drainage and promote uniform heating of food placed on the griddle.

Other objects and features of the invention will become apparent from consideration of the following description taken in connection with the accompanying drawings.

BRIEF DESCRIPTION OF THE DRAWINGS

FIG. 4 is a view taken along the line 4—4 of FIG. 3;

FIG. 5 is an enlarged longitudinal cross-sectional view of the grooved griddle;

FIG. 6 is a view taken along the line 6—6 of FIG. 3;

FIG. 7 is an enlarged view taken along the line 7—7 of FIG. 5;

FIG. 8 is an enlarged view taken along the line 8—8 of FIG. 5; and

FIG. 9 is an enlarged view taken along the line 9—9 of FIG. 5.

DESCRIPTION OF THE PREFERRED EMBODIMENT

Figure 1:
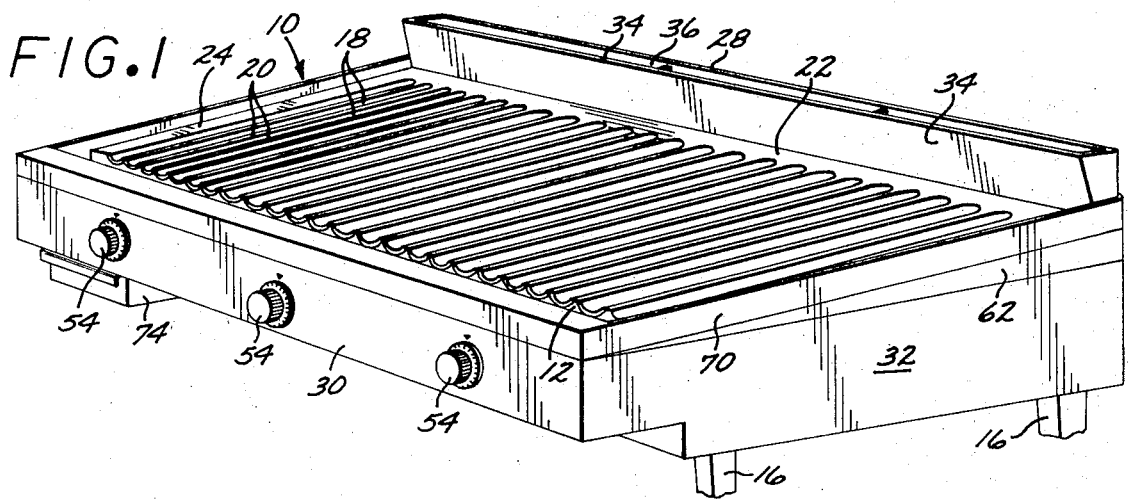
FIG. 1 is a perspective view of a grooved griddle according to the present invention.

Referring now to the drawings, there is illustrated a grooved griddle 10 according to the present invention and comprising, generally, a relatively thick rectangular plate 12 made of cast iron or the like; and a plurality of heat sensors 14 located in the underside of the plate 12, as will be seen.

The griddle 10 can be made a part of an integral cooking unit in a commercial restaurant, or it can be a portable unit adapted for placement over the heat source of an existing installation. The heat source is not part of the present invention and could be an electrical unit, a gas unit or the like. In the embodiment illustrated in the drawings, the griddle 10 is an integral unit supported upon usual legs 16 and communicating with a flue (not shown) to carry off the hot gases from gas burners located in a firebox.

The plate 12 is preferably of uniform thickness and is sloped from rear to front, dropping approximately one inch per foot of groove length.

The upper surface of the plate 12 includes a plurality of alternate, longitudinally extending grooves 18 and ridges 20 arranged in parallel, side-by-side relation transversely of the plate upper surface, thereby defining a continuous, unapertured grilling or broiling area through which liquified food fats cannot drop. The plate 12 includes a continuous border or rear margin 22 and borders or side margins 24 which act as barriers for grease. The rear ends of the grooves 18 are smoothly rounded where they merge into the rear margin 22 to facilitate cleaning of grease and food debris from the grooves 18. The front ends of the grooves 18 extend through the front margin of the plate of form flow paths for liquified food fats. As best seen in FIGS. 7, 8, and 9, the upper surface of each ridge 20 is flat in order to provide a series of uniformly spaced-apart sear stripes on food placed upon the upper surface of the plate 12. Direct contact of the ridges 20 with the cooking food imparts sufficient heat to effect cooking. The food overlying the arcuate or U-shaped grooves 18 is exposed to greater heat radiation because of the greater area of the U-shaped portion of the groove compared to the width of a ridge 20, and because of the closer proximity of the groove to the heat source. Consequently, even though the food is not in contact with the plate 12 in the areas above the grooves 18, the rate of cooking is substantially the same as the rate of cooking of the food in contact with the ridges 20.

Again with reference to FIGS. 7, 8, and 9, it is noted that the depth of the grooves 18 toward the front of the plate 12, as seen in FIG. 7, is greater than the depth of the grooves toward the rear of the plate 12, as seen in FIG. 9. There are two reasons for this. If there is a number of steaks or the like being cooked at one time the amount of liquified food fats will increase as the flow continues along the grooves 18 to the front of the plate 12, and the increasing depth of the grooves better accommodates this increased flow. In addition, as will be discussed in more detail below, the heat applied to the underside of the plate 12 diminishes toward the rear of the plate. Consequently, by making the grooves shallower toward the rear of the plate, the walls of the grooves 18 radiate more heat to the cooking foods because these walls are located closer to the foods.

Figure 3:
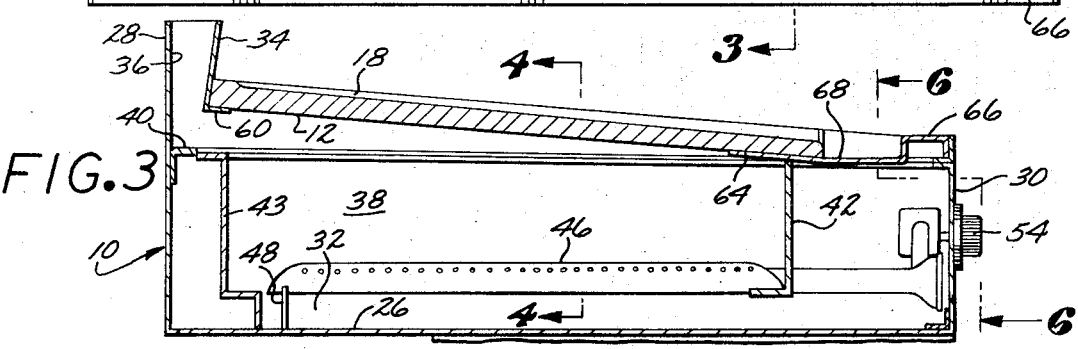
FIG. 3 is a view taken along the line 3—3 of FIG. 2.

With particular reference to FIGS. 3, 4, and 6, it is seen that most of the structure of the griddle 10 other than the plate 12 is sheet metal which is bent or otherwise formed to provide a horizontal base 26, a vertically extending back wall 28, front wall 30, and sides 32. In addition, a generally upwardly extending back splash 34 extends parallel to the back wall 28, and is suitably attached to the rear of the griddle plate 12 and to the sides 32. The back splash 34 is spaced forwardly of the back wall 28 to provide a flue opening 36 for hot gases passing from the firebox 38, which is defined by the base 26, walls 28 and 30, sides 32, and the underside of the griddle plate 12.

When the griddle 10 is installed in a restaurant or the like, the upper margins of the back splash 34, back wall 28, and sides 32 extend into a suitable flue structure (not shown) to carry away the hot gases passing from the firebox 38 and upwardly through the flue opening 36.

A stiffening and supporting angle 40 extends across the back wall 28. A larger support angle or front baffle 42 extends across the front portion of the firebox 38 and is located substantially below the front edge of the griddle plate 12. A similar large angle or rear baffle 43 extends across the rear of the firebox. The angle 40 and front and rear baffles 42 and 43 are secured to the sides 32.

As best seen in FIG. 4, three openings 44 are provided in the front baffle 42 so that three usual and conventional gas burners 46 can be inserted into the firebox 38. The rearward extremities of the burners 46 rest upon a transverse plate 48 which is attached to the sides 32 and which rests upon the base 26.

Burner aeration plates 50 are located between the burners 46 and burner aeration plates 51 are located adjacent the outer side of the outside burners 46. As well known to those skilled in the art, the plates 50 and 51 meter secondary air to the burners 46 to increase the efficiency and uniformity of heating of the grill plate 12.

Gases escaping from the firebox tend to heat the rearward portion of the plate 12 less than the forward portion of the plate 12, and the shallowness of the grooves 18 toward the rear of the plate 10 tends to compensate for this.

Figure 2:
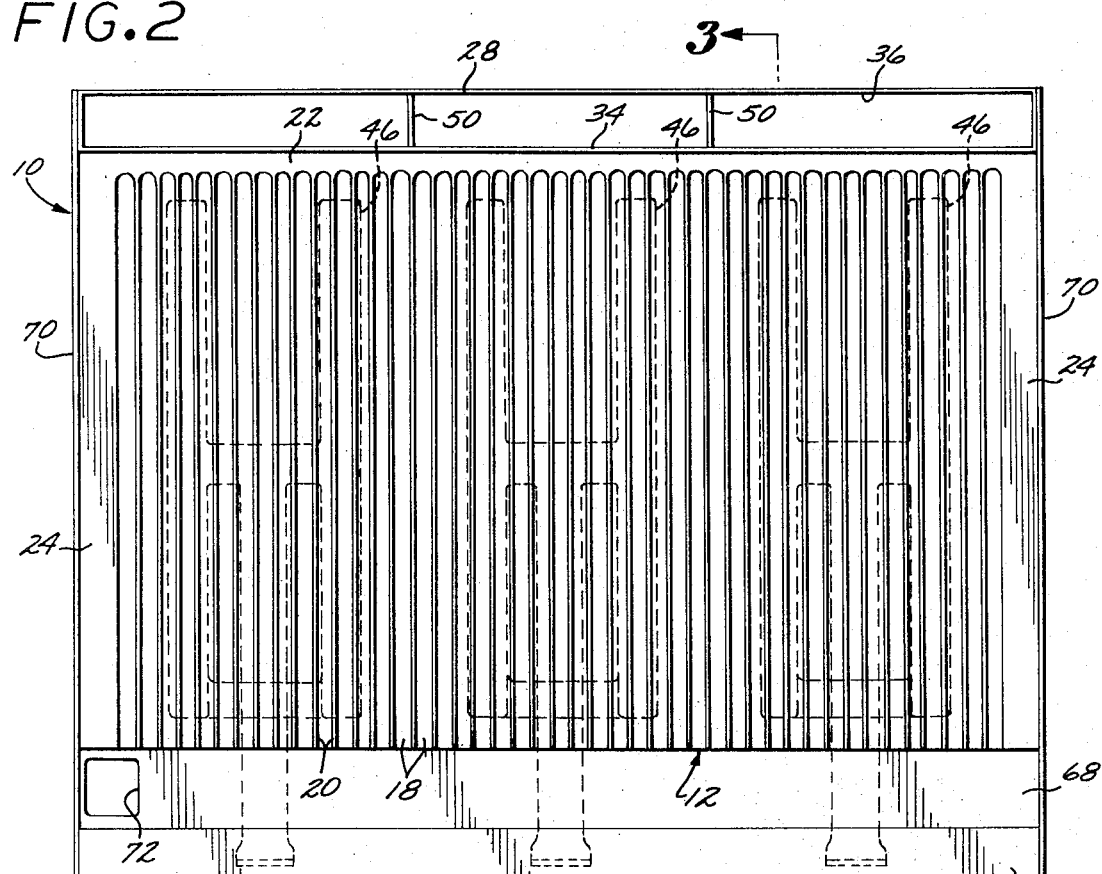
FIG. 2 is a top plan view of the griddle.

Although the burners 46 may take almost any configuration effective to heat the firebox area, each burner preferably has a generally H-shape configuration, as best seen in FIG. 2. Usual thermostatic controls (not shown) associated with the burners 46 are adjusted to provide the proper flame intensity for the desired temperature of the griddle plate 12. The desired temperature is selected by rotation of usual control knobs 54 located on the front wall 30 of the griddle 10. Suitable thermostatic control systems are well-known to those skilled in the art and therefore form no part of the present invention.

Elongated sensors 14 are located in longitudinally extending recesses 58 formed in the underside of the griddle plate 12, as best seen in FIG. 8. By utilizing three sensors 14 that are insulated from the burner flames, and locating them above the burners 46, it is possible to differentially heat the plate 12 to compensate for any localized cooling which may occur when food, and particularly frozen meats, are placed upon one section of the griddle plate 12.

As best seen in FIGS. 3–5, the rearward edge of the plate 12 is supported upon a horizontal toe or flange 60 which is integral with the lower edge of the splash pan 34. The sides of the plate 12 rest upon a C-shape channel 62 of diminishing height from rear to front, as best seen in FIGS. 1 and 4. These channels 62 at either side of the griddle provide the desired slope of the plate 12. The front edge of the plate 12 rests upon a rearwardly extending cross-plate 64 which includes a downwardly open channel section 66 at its forward extremity to define a collection trough 68 adjacent the open forward ends of the grooves 18 in the plate 12. The sides of the trough plate 64 are suitably secured to the sides 32 and the front edge of the channel section 66 rests upon an angle or side splash 70 which in turn rests upon the upper portion of the front wall 30.

The sheet metal portions of the griddle 10 are preferably secured together by conventional spot welding, arc welding, metal screws, or the like. However, the griddle plate 12 is mounted so as to be removable as an integral unit with the back and side splashes 34 and 70 and the collection trough 68.

Referring to FIGS. 2 and 6, the collection trough 68 includes an opening 72 at one end toward which the trough 68 is slightly sloped. Grease flowing from the grooves 18 thus are carried by the sloping trough 68 into the opening 72. The opening 72 permits the grease to fall into an open ended vessel 73 secured to the underside of the trough plate 64, for channeling the grease into a longitudinally extending grease tray 74. The sides of the tray 74 include flanges which slidably rest upon the horizontal portions of a pair of angles 76 attached in any suitable manner to the underside of the base 26. This slidable arrangement allows the tray 74 to be removed for emptying.

Three trays 78 are suitably attached to the underside of the plate 12 adjacent the three heat sensors 14. Each tray 78 includes a spring clip 80 which bears against and bias the associated sensor 14 against the underside of the plate 12.

The foregoing construction and orientation of the griddle 10 provides a means for controlling the heat applied to cooking food so that there are no localized cool or hot spots. In addition, the griddle plate is unapertured so that none of the liquified fats and greases can drop down into the firebox. Instead, most of this grease and fat drains off before it can be vaporized as smoke. Some small portion of the fats are vaporized before they can drain off, but this is desirable to give the meats a desirable broiled flavor.

By eliminating the use of open grids, the clouds of smoke formerly associated with a charcoal or gas burner broiling operation are greatly reduced. Instead, the heated gases flow upwardly into the underside of the griddle plate and are thereafter carried off through a conventional flue. Flare-ups from ignited grease are completely eliminated and the mass of the plate is such that it better distributes the applied heat to the foods being cooked and thereby promotes more uniform cooking. As seen in the drawings, the depth of the grooves is less than half the thickness of the plate whereby a substantial metal mass is available below said grooves for such heat retention and distribution. In addition, the flat ridges between the grooves provide uniform sear stripes on the food being cooked, but without imparting a bitter charcoal taste to the food.

Use of the present grooved griddle greatly facilitates cleaning of the griddle when cooking is finished, there being no grease collection areas except for the easily accessible collection trough at the front of the griddle.

Various modifications and changes may be made with regard to the foregoing detailed description without departing from the spirit of the invention.

I claim:

1. A grooved griddle for grilling foods, said griddle comprising:

a non-apertured, thick metal grill plate adapted to overlie a heat source, said plate having a sloping uncovered upper surface to allow vaporized fats to be carried upwardly past food disposed thereon, and which includes a plurality of sloping, generally parallel grooves and intermediate ridges defining a continuous, unapertured cooking area whereby liquified food fats from said food thereon are unable to drop through said plate to said heat source, the move elevated extremities of the sloping said grooves terminating short of the upper edge of said plate to define an edge margin to act as a barrier for said food fats, the depth of said grooves being less than half the thickness of said plate and defining a substantial metal mass below said grooves; and a plurality of heat sensors disposed in close proximity to said metal mass below said grooves for sensing temperature drops across said metal mass.

2. A grooved griddle according to claim 1 wherein said ridges are flat to provide uniform sear stripes.

3. A grooved griddle according to claim 1 wherein said grooves increase in depth as they extend from the rear to the front of said plate.

4. A grooved griddle according to claim 1 wherein said elevated extremities of said grooves are each characterized by a generally arcuate end wall whereby cleaning of said grooves is facilitated.

5. A grooved griddle according to claim 1 wherein the slope of said plate is approximately one inch per foot.

6. A grooved griddle according to claim 1 wherein one of said ridges is located at each side of said plate to define side margins.

* * * * *